United States Patent Office 3,558,478
Patented Jan. 26, 1971

3,558,478
LUBRICATION SYSTEM AND OIL FILTER THEREFOR
Jerome Geyer, Elizabeth, and Shih-En Hu, Westfield, N.J., assignors to Esso Research and Engineering Company, a corporation of Delaware
No Drawing. Filed Feb. 11, 1969, Ser. No. 798,431
Int. Cl. C10m *11/00;* B01d *39/00*
U.S. Cl. 208—179         14 Claims

ABSTRACT OF THE DISCLOSURE

Lubricating oil used in internal combustion engines involves the circulation and recirculation of the oil from the engine through an oil filter and the return of the filtered oil to the engine. The novel system and treatment contains a filter cartridge within the filter chamber which cartridge is charged with retained discrete particles of at least one relatively oil-insoluble solid inorganic compound selected from the group consisting of the iodides of alkali metal and alkaline earth metals, including magnesium, with or without their admixture with transition metal compounds and/or inorganic compounds containing reducing anions such as those containing sulfur or phosphorus therein. The passage of the circulating oil in the system may be, optionally, through a chamber in the circulating oil system which is ahead of or after the oil filter, which chamber retains the solid discrete particles of such a compound or mixture of compounds and in place of or in addition to such compounds being placed within the oil filter.

DESCRIPTION OF THE INVENTION

The present invention relates to lubricating oil circulating systems used in association with internal combustion engines and involves the circulation of mineral lubricating oil from the crankcase of internal combustion engines through an oil filter or oil contacting chamber and the return of the filtered or treated oil into the internal combustion engine for reuse therein. More particularly, the invention relates to oil filters and optionally to a chamber ahead of or after the oil filter for contacting the lubricating oil with discrete particles of at least one relatively oil-insoluble solid inorganic compound, or mixture of such compounds or other inorganic compounds, selected from the group consisting of the iodides of Groups I-A and II-A, of the Periodic Table of the Elements wherein such compounds are contained in the oil filter, in a filter cartridge contained within the oil filter, or in a contacting chamber ahead of or after the oil filter. The iodides are those of the alkali metals and the alkaline earth metals, including magnesium. By incorporating such discrete solid particles of inorganic iodides into the oil filter or the oil contacting chamber, in the solid state or impregnated into filter packing materials or other inert carriers and retaining them therein, it is possible to maintain the lubricating oil in a fresher condition, free of sludge and decomposition products and with the internal engine surfaces being maintained in a cleaner condition with a minimum of rust forming or other corrosion tendencies present than has heretofore been thought to be possible of attainment.

Mineral lubricating oils, especially those used for the lubrication of internal combustion engines, are required to withstand severe superatmospheric temperatures. With the advent of various devices being presently incorporated into engine construction designed to close off the oil crankcase from the atmosphere, less cooling effects are possible in the crankcase which gives rise to still higher temperatures in the oil than has heretofore been usual. The oils, therefore, are subjected to even more severe degradation conditions and steps must be taken to minimize or prevent, insofar as possible, degradation of such oils. Additionally, the products of combustion of the fuel-air mixtures are not completely eliminated by the exhaust system, being forced or blown by the piston rings, into the crankcase, so that they contaminate the lubricating oil as well. These combustion products, chiefly the oxidized combustion chamber products, are believed to be precursors of sludge formation within the lubricating oils once they come in contact with the lubricating oil.

The present invention is designed to treat, during use, the lubricating oil containing various oxidative-degradation products and these products of combustion so as to minimize the formation of sludge in the lubricating oil and to maintain a stability in the oil over longer periods of time. The effective removal from the oil of the oxidized or partially oxidized products contained in the blow-by and which thus find their way into the lubricating oil is a major object of the invention. The use of the hereinbefore mentioned metal iodide compounds effectively and unexpectedly accomplishes this purpose, thus achieving far greater periods of operation between oil changes. At least these harmful products are rendered less harmful, if not actually completely removed, by such treatment. This is for the reason that longer periods of operation under high temperature conditions are possible due to the fact that sludge formation is considerably delayed or minimized where the oil is contacting the metal iodides in an oil filter or a contacting chamber. The metal iodide compounds of Groups I-A and II-A provide an advantageous overall minimizing of sludge formation. The nitrogen in the air introduced into the combustion chambers becomes fixed after combustion as oxides of nitrogen. The oxides of nitrogen, by reason of blow-by, find their way into the crankcase oil and are, in fact, effectively removed or rendered ineffective as regards deposit formation by the novel treatment hereinafter more fully described.

Various attempts have been made in the past to treat lubricating oils with inorganic substances which are substantially of an oil-insoluble nature but these attempts for the most part have involved the use of basic compounds, such as calcium hydroxide, calcium carbonate, the alkali metal bases and the like. These treatments were designed to neutralize the acidity developed in the oil through the continued use of the oil with the resultant breakdown thereof. Thus, for example, Maverick et al., 1,914,999, treats oils with a solid base such as sodium oxide, potassium oxide, magnesium oxide or the corresponding carbonates. Fairlie, 2,262,526, incorporates alkaline earth metal basic compounds in the oil filters for the purpose of removing acidity. Additionally, other patents, such as Sarui, 3,154,488, treat lubricating oils to regenerate them with metal alloys of magnesium, aluminum, zinc, tin or antimony; and finally, Puddington, 2,852,454, shows the treatment of lubricating oils by adding to the oil filters sodium-solder alloy compounds, or metallic calcium-tin-lead solder compounds for the purpose of minimizing acidity and sludge formation. Further, Cooper et al., 2,156,803 disclose the addition of colloidal lead iodide or cadmium iodide directly into mineral lubricating oils in amounts of from 0.5 to 5.0% for the purpose of increasing the film strength and avoiding or minimizing the rupture or breaking of such films. Cooper et al. teach that it is not the chemical structure but the plate-like shape of the crystals that determines the efficacy of their selected inorganic colloidal oil additives in increasing oil film strength. Elemental iodine, with or without various other materials designed to maintain the iodine in suspension, has been directly added to lubricating oils. See 3,184,409 and 3,220,949. In many instances involving prior attempts to improve the useful life of lubricating oils, the approach has been to neutralize the developed acidity of the oil during use, to increase oil film strength, or to incorporate a reducing agent which will serve as an antioxidant which, in turn, will minimize the oxidative breakdown of the constituents of the oil.

The instant novel process affords, surprisingly, a very useful method of removing the products of combustion that find their way into the lubricating oil during its use by reacting these products so that they are rendered innocuous as far as deposit formation is concerned. Additionally, since the metal iodide employed also has a catalytic reducing action, it is doubly useful for it is not only capable of reducing the sludge precursors (products of combustion) but it is likewise useful as elemental iodine, which, in turn, may be reduced to the iodide and the cycle is then repeated. Specifically, the iodide compounds that are useful are those iodides of metals of Groups I–A and II–A of the "Periodic Table of the Elements" published by E. H. Sargent & Company, Chicago, Ill., Copyright 1964. Specifically, the preferred metal iodides are those of lithium, sodium, potassium, calcium, barium and magnesium. Other iodides of metals of these two groups may be used but they are less likely to be used either because they are not readily commercially available or they are too expensive, or both.

Single iodide compounds of the aforementioned metals may be used or admixtures of two or more of these compounds may be employed. Additionally, the alkali metal and alkaline earth metal iodides may be employed in conjunction with other metal iodides such as the iodides of the transition metals, i.e. those metals of Groups I–B, II–B, III–B, IV–B, V–B, VI–B, VII–B and VIII of the Periodic Table. These transition metal iodides as well as other transition metal compounds are disclosed and claimed in our copending U.S. application Ser. No. 784,221, filed Dec. 16, 1968. The other transition metal compounds (other than iodides) may also be used in conjunction with the Groups I–A and II–A metal iodides with excellent results so far as sludge inhibition, antirust, etc. of the lubricating oil is concerned. A particularly advantageous mixture of the aforementioned iodides of the alkali metals or iodides of the alkaline earth metals involves the use, in conjunction therewith, of the relatively oil-insoluble solid inorganic reducing compounds whose anion moiety possesses an $E°$ oxidation-reduction potential greater than $-0.8$ if measured in aqueous acid solution and greater than 0 if measured in an aqueous alkaline solution against a standard hydrogen electrode. See Wendall M. Latimer "Oxidation Potentials," second edition, fifth printing (August 1961), pp. 2–3, and Tables 84 and 85. These latter compounds are described and claimed in our copending application Ser. No. 665,249, filed Sept. 5, 1967. These compounds contain phosphorus or sulfur in the anion moiety, each is a valence state less than their fully oxidized state. Thus, the phosphorus anion contains phosphorus in a valence state of from $-3$ to $+4$ inclusive and the sulfur in a valence state between $-2$ and $+4$ inclusive. The anions are phosphides, hypophosphites, metaphosphites, pyrophosphites, orthophosphites, hypophosphates, sulfides, sulfoxylates, hyposulfites, sulphites and dithionites. The cations combinable and combined therewith are preferably hydrogen, ammonium, an alkali metal or an alkaline earth metal, although the cation may also be a transition metal as defined in our application Ser. No. 784,221, filed Dec. 6, 1968, and of the Periodic Table groups hereinbefore defined. Typical compounds of the reducing anion type that are useful in conjunction with the hereinbefore mentioned alkali metal and alkaline earth metal iodides are: calcium hypophosphite, ferric hypophosphite, magnesium hypophosphite, calcium phosphide, sodium pyrophosphite, zinc hypophosphite, cadmium phosphide, zinc sulfite, sodium sulfite, magnesium sulfite, potassium acid sulfite, ammonium sulfite, hypophosphorous acid, phosphorous acid, zinc sulfite, barium sulfide, calcium sulfide, cobaltic sulfide, stannous sulfide, nickel disulfide, manganic sulfide, etc. Many more specific suitable compounds are disclosed in the aforementioned copending application. A still further modification of the instant invention involves the use of mixtures of all three types of solid relatively oil-insoluble inorganic compounds as set forth in this disclosure, the transition element above-mentioned copending application and the reducing anion above-mentioned copending application. Specific and typical examples of three component admixtures that are useful are: magnesium iodide-chromous iodide-magnesium hypophosphite; potassium iodide-ferrous iodide-calcium sulfide; lithium iodide-nickel ammonium sulfate-zinc phosphite; barium iodide-chromium chloride-calcium hypophosphite, calcium iodide-potassium ferrocyanide-ferric hypophosphite; sodium iodide-manganese sulfide-zinc phosphite, etc.

Many of the heretofore set forth specific inorganic iodide compounds exist in anhydrous form but, in many instances, hydrates of these compounds are most readily available commercially. The hydrates may exist with more than one molecule, in fact, several moles, of water crystallized in association with their structures. In many instances, the hydrate form is the most commonly marketed form and is thus more generally readily available. There is little point, if this is the case, in attempting to employ the anhydrous form for the reason that once the compounds are incorporated into the oil system as hereinbefore described, almost immediately small amounts of water already present in the lubricating oil or eventually becoming present in the lubricating oil will contact the anhydrous salts and so they are, in effect, converted to the hydrated form.

The solid inorganic metal iodide particles employed may range in size from between about $-4$ and about $+250$ mesh, preferably between about $-20$ and about $+100$ mesh Tyler screen size. The size of the solid particles is not critical but they should not be, in any event, of sufficiently small size that any substantial quantity of them will pass through the retainers, the filter packing material or the contacting chamber and be circulated in the oil. If they are of sufficiently small particle size that they behave substantially as colloids in the oil, no harm is done since their action will still be effective on the degradative products in the oil. Preferably, however, for the most part, the particles of the solid compounds should be retained in the filter or other contacting chamber.

Another method which may be employed for incorporating the basic metal iodides into the oil filter is to impregnate the filter packing material or an inert carrier with an aqueous solution of such salts, in cases where the salts are readily water soluble, after which the impregnated materials, for example, porous paper packing, may be gently heated to dryness to drive off the water and to maintain the compounds in intimate association with the packing material. No specific minimum amount of the basic metal iodide or mixtures thereof with other heretofore mentioned inorganic solid compounds is necessary or found to be critical, it being sufficient that all or a portion of the filter element, i.e., the packing in the filter, either contain impregnated thereinto one or more of the aforementioned compounds in solid form or that solid particles sufficient to inhibit corrosion and sludge formation and sufficiently large to be retained in the filter element are placed in and retained by the filter element. Solid particles of sufficient coarseness to be retained in the filter by the filter element or the filter packing material may be positioned at the inlet side of the filter or between layers of filter packing material so as to be largely retained therein for the service life of the filter or the coarse solid particles may be in a separate chamber in the oil circulation system ahead of or after a conventional oil filter. Usually, in the latter case, a fine mesh screen (i.e. 325 mesh or slightly more porous) serves as a support and retainer for the solid particles.

No specific structural design of the filter element is necessary. Preferably, the solid particles of solid inorganic iodides should be retained in the filter and not be entrapped or carried with the oil from the filter packing chamber, or filter, to the engine, although some small amounts in colloidal form or dissolved in the entrained water may be removed from the filter and be carried into the crankcase oil sump. In ordinary automotive internal combustion engines having an oil capacity of 4 or 5 quarts of lubricating oil, the oil filter or other chamber should contain, either as such or impregnated on the filter medium or other inert carrier within the filter, between about 10 and about 150 grams of the selected iodides or inorganic admixtures, in solid form. Such an amount is sufficient to enable the filter to retain, during its normal life of operation, the solid compounds over and beyond that amount taken up by any water with which the solid compounds come into contact during the course of the normal operation of the engine between oil changes. If desired, however, it is, of course, proper that larger or smaller amounts of such compounds be incorporated depending upon the particular usage of the engine and the amount of engine running time elapsing between filter changes or chamber rechargings.

If a carrier medium is to be employed (in practical operation this is advantageous), it is preferable that it be a relatively porous carrier, that the iodides be impregnated therein from a suitable solution thereof (usually water), and that it be relatively inert with respect to the oil and to the basic metal iodides. Any inert carrier is suitable, particularly a porous one, so long as the size of the solid carrier particles is sufficiently large to be retained in the filter during operation of the engine and during the circulation of the oil through the filter. Suitable carrier substances include porous paper, diatomaceous earth, kaolin, kieselguhr, activated clay, charcoal, or fullers earth, although any other inert, relatively porous or coated (instead of impregnated) nonporous carrier is equally useful so long as the carrier retains the solid basic metal iodides within the filter and solids-free oil, as an effluent from the filter, is permitted to be returned to the engine for reuse. In some cases, even coarse sand, which is inert, may serve as the filtering medium so long as it is retained within the filter and is not carried by the effluent oil to the engine.

The oils employed in association with the present invention are those customarily employed in lubricating internal combustion engines including automotive engines, diesel engines, both of the light and heavy duty types, and, in fact, for lubricating any engine employing lubricating oils for the purpose of lubricating the bearings, piston walls, valves, etc., of such engines. These oils are many and of varied types. The invention and its success in the use of the alkali metal and alkaline earth metal iodides in oil filters does not depend upon the use of any particular lubricating oil but is applicable to all such oils heretofore used in such lubrication systems. As is well known and recognized, these oils may be of paraffinic, naphthenic or mixed types and they may contain the conventional additives which are customarily and conventionally employed in such oils such as, for example, viscosity index (V.I.) improvers, pour point depressants, antioxidants, sludge dispersants, antiwear agents, etc.

In the comparative runs set forth in the following examples, a base oil blend of a solvent extracted neutral mid-continent oil of SAE 10W–30 grade was employed. It contained conventional additives such as about 10% of its weight of a V.I. improver, for example, polyisobutylene, between about 3.5 and about 4 wt. percent of a dispersant which was a polyisobutenylsuccinic anhydride imide derivative of tetraethylenepentamine, small amounts of a wax alkylated naphthalene as a pour point depressant, an antioxidant and an antiwear agent, namely, the zinc salt of di($C_4$–$C_5$ alkyl) dithiophosphate. Additionally, it contained less than 1% of an overbased calcium petroleum sulfonate. The oil as compounded has a pour point of about −20° F. maximum and a V.I. of about 136 minimum.

As illustrative of the character of the invention but with no intention of being limited thereby the following examples are set forth.

EXAMPLE 1

A Ford 6-cylinder engine was run in a series of cyclic temperature sludge tests. The base oil blend employed was that previously described. In one series of tests, a filter commercially available and sold for use in automotive lubricating systems was employed. It consisted of a porous paper packing or filter element and had interspersed and retained within the paper filter element in separate porous paper containers, for each separate run, about 52 grams of potassium iodide in one instance, a like amount of sand (control) as another run, and finally, about 100 grams of magnesium iodide as a third run. In each case the iodide employed had an average mesh particle size of between about 20 and about 40 standard Tyler screen size. The sand particles (control test run), however, had about a 30–40 mesh screen size on the same basis. The comparative cyclic temperature sludge test was carried out as follows. The engine was run under alternate controlled temperature cycles. The spark timing was set at 11° BTC (before top center). The air to fuel ratio was maintained between 13.7:1 and 14.5:1 and the engine was placed under constant load of 140 foot lbs. of torque and was run at 1500 r.p.m.±15 r.p.m. The first cycle lasted 5 hours and the oil sump temperature was maintained at 150° F., ±5° F. Following this, a second cycle lasting 2 hours, the oil sump temperature was maintained at 215° F., ±5° F. The tyo cycles were alternated, in sequence, until the desired total test hours had elapsed. Make-up oil was added as required so as to maintain the oil level in the crankcase at all times between about 5 and 5½ quarts. At the end of selected periods of test time, the engine was inspected by disassembling it sufficiently to permit visual examination of several of the parts, including the rocker arm assembly, rocker arm cover, the cylinder head, the push rod chamber and its cover, the crank shaft, and the oil pan. These parts were visually and quantitatively rated for sludge deposits using a CRC (Coordinating Research Council) Sludge Merit Rating System in which a numerical rating of 10 represents a perfectly clean part and the numerical scale decreases as deposits build up and the parts become covered with greater amounts of sludge. The sludge merit ratings of the various parts are averaged to give an overall engine sludge merit rating. In all tests, the filter element was one made of paper and is readily available on the open market.

The blank or control test, i.e. the use of 52 grams of sand as a filter packing material using the aforementioned oil blend, resulted in a sludge merit rating of 6 at the end of about 147 hours of operation whereas in the case of the use of the same amount of potassium iodide the same merit rating was not reached until 189 hours of operation. On the other hand, with the use of 100 grams of magnesium iodide, about 378 hours of operation were required before a sludge merit rating of 6.0 was reached. As the data show, 42 additional hours of severe operation was required to reach the same sludge merit rating when using potassium iodide as compared to the control sample when using sand. Surprisingly, magnesium iodide usage required 378 hours to attain a sludge merit rating of 6.0. Although there is about 2.3 times as much iodine in 100 grams of $MgI_2$ as there is in 52 grams of KI, it is readily apparent from the examination of these data that there is a vast differential improvement in sludge inhibition and deposition as between the engine operated using a filter containing in effect no additive in the filter, i.e. sand, which was inert so far as any chemical action on the lubricating oil was concerned, and one containing an alkali metal iodide or an alkaline earth metal iodide.

Having now thus set forth the general nature and the specific embodiments of the invention, what is desired to be secured by Letters Patent is:

1. In a lubricating oil system for lubricating internal combustion engines with a mineral lubricating oil and involving the circulation of such oil, the improvement which comprises employing, in the oil circulation system, a solids-oils contacting chamber containing discrete retained particles of at least one relatively oil-insoluble solid inorganic compound selected from the group consisting of the iodides of the metals of Groups I–A and II–A of the Periodic Table of the Elements.

2. In a lubricating oil system for lubricating internal combustion engines with a mineral lubricating oil and involving the circulation of such oil, the improvement which comprises employing, in the oil circulation system, an oil filter containing, retained therein, discrete solid particles of at least one relatively oil-insoluble inorganic compound selected from the group consisting of the iodides of the alkali metals and the iodides of the alkaline earth metals.

3. A lubricating oil system as in claim 2 wherein the oil filter contains at least one alkali metal iodide.

4. A lubricating oil system as in claim 2 wherein the oil filter contains at least one alkaline earth metal iodide.

5. A lubricating oil system as in claim 3 wherein the alkali metal iodide is potassium iodide.

6. A lubricating oil system as in claim 4 wherein the alkaline earth metal iodide is magnesium iodide.

7. A lubricating oil system as in claim 2 wherein the solid relatively oil-insoluble inorganic compound is associated with a carrier selected from the group consisting of porous paper, diatomaceous earth, kaolin, kieselguhr, activated clay, charcoal and fullers earth.

8. An oil filter through which circulating mineral lubricating oil is passed in connection with the operation of internal combustion engines, said filter containing, retained therein, solid particles of at least one relatively oil-insoluble solid inorganic compound selected from the group consisting of the iodides of the metals of Groups I–A and II–A of the Periodic Table of the Elements.

9. An oil filter as in claim 8 wherein the solid inorganic compound is selected from the group consisting of the iodides of the alkali metals and the iodides of the alkaline earth metals.

10. An oil filter as in claim 9 wherein the solid inorganic compound is an alkali metal iodide.

11. An oil filter as in claim 9 wherein the solid inorganic compound is an alkaline earth metal iodide.

12. An oil filter as in claim 10 wherein the alkali metal iodide is potassium iodide.

13. An oil filter as in claim 11 wherein the alkaline earth metal iodide is magnesium iodide.

14. An oil filter as in claim 8 wherein the relatively oil-insoluble solid inorganic compound is associated with a carrier selected from the group consisting of porous paper, diatomaceous earth, kaolin, kieselguhr, activated clay, charcoal, and fullers earth.

References Cited

UNITED STATES PATENTS

| | | | |
|---|---|---|---|
| 2,729,595 | 1/1957 | Denton et al. | 196—39 |
| 3,489,676 | 1/1970 | Hu et al. | 208—179 |
| 1,745,167 | 1/1930 | Harris et al. | 208—179 |
| 1,866,970 | 7/1932 | Garland et al. | 208—179 |

DELBERT E. GANTZ, Primary Examiner

J. M. NELSON, Assistant Examiner

U.S. Cl. X. R.

210—501; 184—6